United States Patent [19]
Hager

[11] Patent Number: 5,160,933
[45] Date of Patent: Nov. 3, 1992

[54] RADAR ALTIMETER WITH SELF-CALIBRATION FEATURE

[75] Inventor: James R. Hager, Crystal, Minn.

[73] Assignee: Honeywell Inc., Minneapolis, Minn.

[21] Appl. No.: 702,403

[22] Filed: May 20, 1991

Related U.S. Application Data

[63] Continuation-in-part of Ser. No. 573,988, Aug. 28, 1990, abandoned.

[51] Int. Cl.[5] .............................................. G01S 7/40
[52] U.S. Cl. .................................. 342/174; 342/120; 367/902
[58] Field of Search .................. 342/174, 76, 77, 120, 342/123; 367/100, 902; 340/970

[56] References Cited

U.S. PATENT DOCUMENTS

| | | | |
|---|---|---|---|
| 3,309,703 | 3/1967 | Ammon et al. | 342/120 X |
| 3,544,996 | 12/1970 | Pile | 342/174 |
| 3,588,899 | 6/1971 | Strauch | 342/174 X |
| 4,053,890 | 10/1977 | Woodson, III et al. | 342/174 X |
| 4,106,020 | 8/1978 | Johnson | 342/174 X |
| 4,435,712 | 3/1984 | Kipp | 342/174 X |
| 4,538,150 | 8/1985 | Bone, Jr. | 342/174 |
| 5,047,779 | 9/1991 | Hager | 342/120 |

Primary Examiner—Tod Swann
Attorney, Agent, or Firm—Ronald E. Champion; Thomas J. Nikolai

[57] ABSTRACT

A radar altimeter incorporates circuitry for automatically adjusting altitude readings for variations caused by altitude and temperature changes. Normal target tracking of the radar is intermittently interrupted and a calibration sequence is interjected. The current altitude and receiver AGC information at the time of each interruption is temporarily stored and a test is initiated in which a pseudo radar return at that altitude is introduced to the receiver. The receiver operates on the pseudo return as it would on an actual return. The transmit power is adjusted automatically for the correct signal level at the tracker. The resultant altitude measured for the pseudo return is compared to a known test altitude and any difference is stored away as a correction factor to be applied to the altitude reading which had been stored at the time that its operation had been interrupted to perform the calibration test.

6 Claims, 2 Drawing Sheets

RADAR ALTIMETER WITH SELF-CALIBRATION FEATURE

CROSS-REFERENCE TO RELATED APPLICATION

This is a continuation-in-part of application Ser. No. 07/573,988, filed Aug. 28, 1990.

BACKGROUND OF THE INVENTION

I. Field of the Invention

This invention relates generally to aircraft instrumentation for indicating the altitude of an aircraft relative to the earth's surface and more particularly to a radar altimeter which includes apparatus for calibrating the instrument so as to maintain altitude accuracy under varying operating conditions.

II. Discussion of the Prior Art

A typical prior art aircraft radar altimeter comprises a transmitter which is periodically triggered to generate a pulse of electromagnetic energy which is radiated from a transmitting antenna and a receiver, operatively coupled to a receiving antenna, for receiving an echo or return pulse from a target (ground). Included in the receiver is a closed-loop servo tracker which functions to position a range gate at the leading edge of the return pulse. Further means are provided for measuring the time interval between the transmitted pulse and the range gate, this interval being a measure of the distance to the target.

It is known that such things as temperature variations, return signal strength and range gate width can affect the accuracy of the radar altimeter. Specifically, temperature variations can impact the accuracy of the radar delay timing circuitry as well as various threshold references used in the closed-loop servo tracker. Variations in the signal strength of the return signal and the resultant signal-to-noise variance are known to affect the point on the leading edge of the return signal at which the closed loop tracker positions the range gate.

In the past as taught in the Pile U.S. Pat. No. 3,554,996, these variances have been corrected by providing a test signal at a fixed delay and a fixed amplitude to represent ground return. The altimeter then processes the simulated return and the resulting altitude is compared with the fixed delay to derive the error magnitude. The resulting error is then used to correct the altitude at all altitudes in this group of altitudes. These closed loop systems are only slightly more accurate than earlier open-loop compensated systems because the test signal is set at discrete fixed range delays, not at the actual aircraft altitude, and the test signal amplitude is also set to a pre-determined fixed level at these test altitudes, not at the actual ground return amplitude. When it is considered that it is most essential to safe flying that indicated altitudes be highly accurate at lower flying altitudes, these prior art systems are deficient.

In order to compensate for errors in the altimeter altitude time delay reference, the simulated target must be placed at the present altitude. Further, in order to compensate for altimeter gate overlap errors on the ground return, the signal strength of the simulated target must correspond to the ground return amplitude, which can vary as much as 50 dB or 100,000 to 1.

It is accordingly a principal object of the present invention to provide an automatic, closed-loop, self-calibration system for appropriately correcting indicated radar target range with particular application to radar altimeter designs requiring high accuracy and to thereby eliminate the need for manual calibration to compensate for extreme variations in temperature and return signal strength by placing the simulated target at the actual aircraft altitude delay and adjusting the amplitude of the simulated target to the actual ground return amplitude.

SUMMARY OF THE INVENTION

The above described object is attained in accordance with the present invention by incorporating into the radar altimeter, hardware and software for intermittently injecting very short duration self-calibration sequences into the normal target tracking mode of operation. The present altitude of the aircraft and the present receiver AGC level at the time of interruption is stored and a test is initiated in which a simulated or pseudo radar return at the present altitude at which the aircraft is flying and at the same amplitude as the present ground return is introduced to the receiver. The receiver operates on this pseudo return in the same fashion that it operates on an actual return, i.e., the control tracker servo-loop forces the range gate to track the leading edge of the pseudo return and the receiver gain is maintained by holding the automatic gain control fixed to the level during track, and the simulated target is closed loop adjusted to provide the proper signal level. The resultant altitude measured for the pseudo return is compared to the known test altitude and the altitude difference, if any, comprises an error which is stored in an altitude correction memory for later use in correcting the altitude measured by tracking the ground return. Because all signal paths and associated circuitry signal-to-noise levels, and altitude dependent parameters, such as transmit pulse width, range gate width, duty cycle, and receiver gain used during the calibration phase are the same as those used during normal ground tracking operation, very accurate altitude calibration results. In the same fashion, because the reference clock which controls the simulated or pseudo return delay is the same crystal controlled clock used to position the range gate on the ground return, it can be made accurate within a fraction of a foot.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
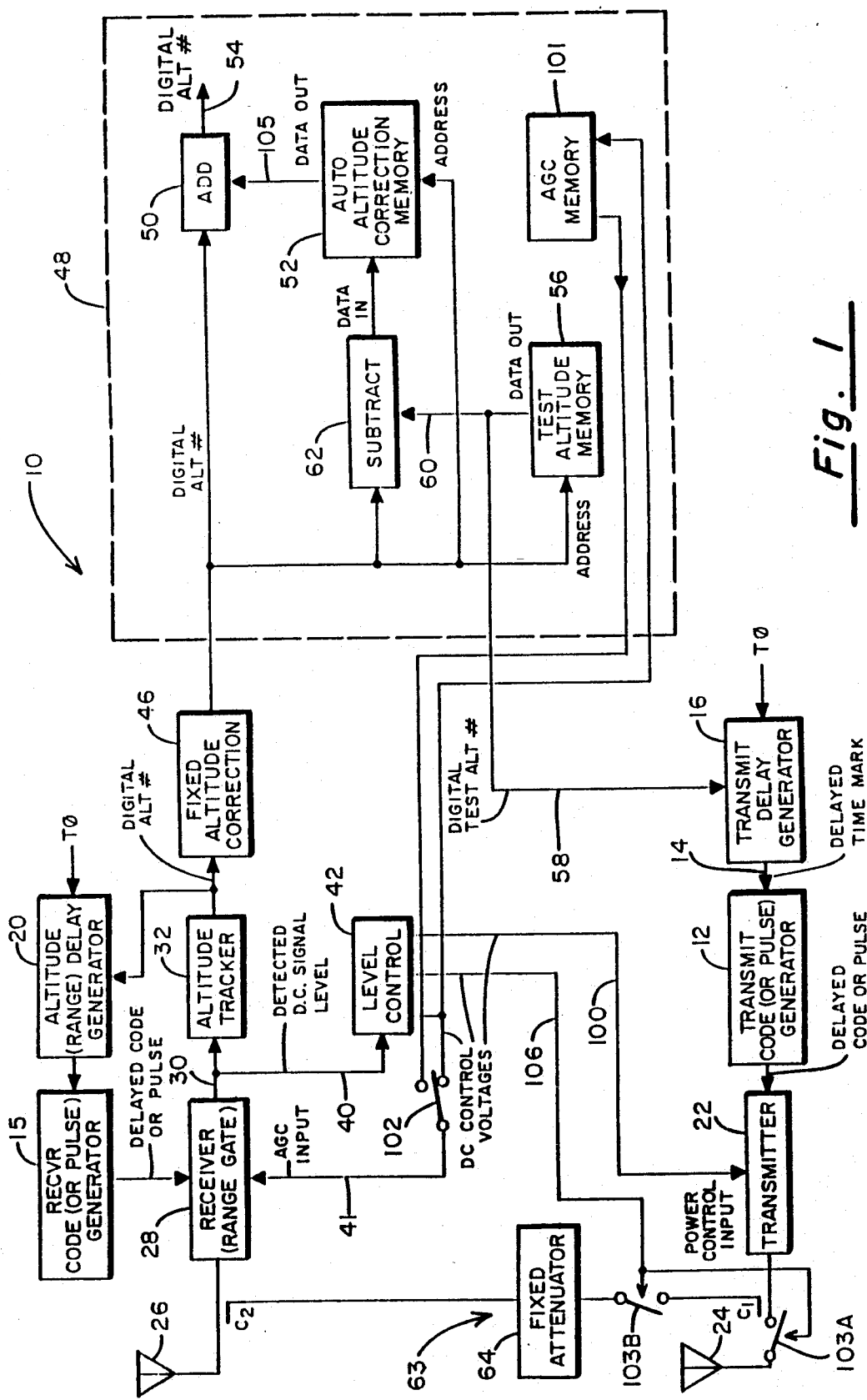
FIG. 1 is a schematic block diagram of a radar altimeter incorporating the automatic calibration circuitry of the present invention.

Referring first to FIG. 1, there is indicated generally by numeral 10 a radar altimeter incorporating the automatic calibration circuitry of the present invention. It is seen to comprise a transmit code pulse generator 12, the function of which is to generate the transmit modulation code at a time coincident with the transmit timing pulse on line 14. The transmit timing pulse is generated by the transmit delay generator 16, which delay is controlled by a test altitude memory 56 as will later be described. In like manner, the receive code generator 15 generates the receive demodulation code coincident with receive timing pulse generated by the range delay generator 20, which delay is controlled by the altitude tracker 32. Both the transmit delay from generator 16 and the range delay generator 20 receive a marker pulse $T_0$ as a reference and the delay value of the Transmit Signal Delay 20 determines the time interval following application of the $T_0$ command that the transmitter 22 is triggered to emit a pulse of electromagnetic energy. In the normal tracking mode, the delay value is zero.

Following a delay interval which is dependent upon the altitude of the aircraft, a radar return signal radiated from antenna 24 will be picked up by the receiving antenna 26 and applied as an input to a radar receiver 28. The output of the receiver is connected by a line 30 to a closed-loop servo tracker 32 which integrates the energy picked up by the receiver, compares the integrated energy to a reference and sets the a range delay 20, positioning the receive code to coincide with the leading edge of the coded input return signal to the receiver 28.

Figure 2:
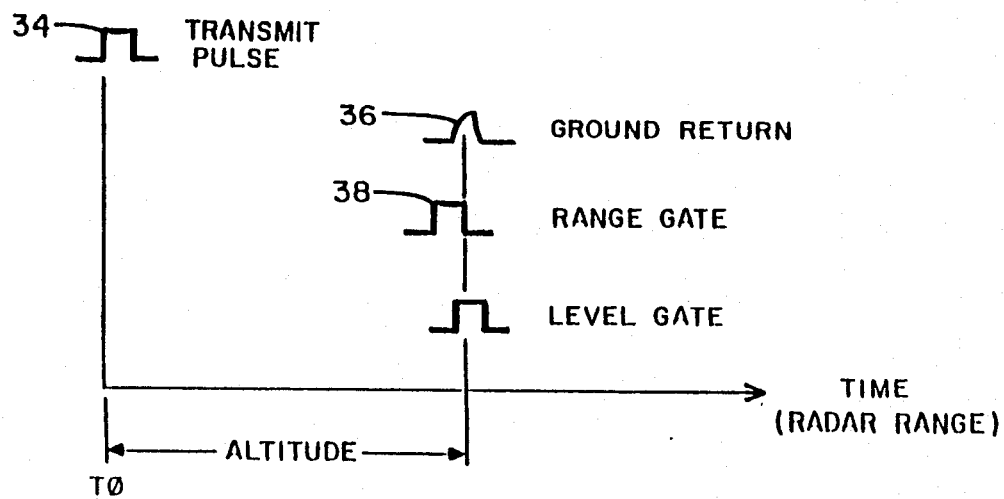
FIG. 2 is a signal diagram helpful in explaining the operation of the altimeter of FIG. 1 when operating in a normal ground tracking mode.

Referring to FIG. 2, when the radar altimeter of the present invention is operating in its normal ground tracking mode, the transmit delay generator 16 interposes zero delay between the time of occurrence of the transmit command $T_0$ and the delivery of the transmitter output pulse to the transmitting antenna 24. The transmit pulse is identified by numeral 34 in FIG. 2. Some time later, a ground return signal 36 is picked up by the receiver and the tracker 32 controlling the Range Delay generator 20 shifts the range gate timewise so that it is positioned at the leading edge of the ground return signal 36. The aircraft altitude is then proportional to the time interval between the time $T_0$ and the leading edge of the range gate 38.

Referring back to FIG. 1, it can be seen that the output from the receiver 28 is also applied, via line 40, to a level control circuit 42 which, in its simplest form, comprises an automatic gain control loop which is operative to hold the amplitude of the input signal to the altitude tracker 32 relatively constant. It does so by controlling the transmitter 22 output power level, via the transmit power control input on line 100, and by controlling the gain of the receiver via the AGC input on line 41.

The altitude output from the tracker 32 is coupled not only to the range gate delay generator 20, but to a fixed altitude correction circuit 46, the function of which is to compensate for fixed delay errors including delays attributable to the antenna cables and to the ground-to-antenna height with the aircraft on the ground.

Except for the transmit delay generator, the circuitry thus far described can be considered as somewhat typical of conventional, prior art radar altimeters. The circuitry shown enclosed by the dashed line box 48 in conjunction with the transmit delay generator is added to provide the automatic self-calibration capability. The circuitry shown within the broken line box 48 is represented by functional blocks, but those skilled in the art will understand that the functions can be implemented in a variety of ways including discrete logic or a programmed microprocessor. Thus, limitation to only one such implementation is not intended.

As can be seen in FIG. 1, the self-calibration circuitry 48 includes adder means 50 for algebraically summing the output from fixed altitude correction circuit 46 with an altitude correction factor stored in automatic altitude correction RAM scratch-pad memory 52 to provide a correction for all possible altitudes on line 105.

The self-calibration circuitry 48 also includes a test altitude memory 56 which functions to hold the present altitude just prior to initiating the auto-calibration operation and throughout the duration of the short interruptive test sequence. The output from the test altitude memory 56 which is a digital test altitude number is applied over line 58 to the transmit signal delay generator 16 and over line 60 to a subtract circuit 62. The output from the subtract circuit 62 is fed to the automatic altitude correction memory 52.

The self-calibration circuitry 48 also includes an AGC memory 101, which holds the present AGC level just prior to initiating the auto-calibration operation and throughout the duration of the test. Thus, at the start of the test, memory 101 interrupts the normal closed loop AGC path through switch 102 and holds the AGC level on line 41 at the past stored level. It is a further feature that during the test, the transmit power control closed loop, consisting of level control block 42 and line 100, is not interrupted. The result is that the gain of the receiver is held at the previous level experienced in the normal track mode, and the closed loop level control of the transmit power (which becomes the simulated target) automatically sets the simulated return strength to precisely the level of the previous actual ground return.

The self-calibration circuitry 48 also includes a calibration path indicated generally by numeral 63 which includes an RF switch 103B, fixed attenuator 64, and signal couplers $C_1$ and $C_2$ disposed between the output of transmitter 22 and the input of the receiver 28. Included in series between the transmitter 22 and the sending antenna 24 is the RF switch 103A. When the system is operating in its normal ground tracking mode, the attenuator 64 and switch 103B act as a very high impedance or an open circuit in the calibration path 63, and switch 103A acts as a very low impedance path connecting transmitter 22 directly to transmit antenna 24. When in its self-calibration mode, however, the level control block 42, via line 106, sets switch 103B to a relatively low impedance value, and 103A to a high impedance value.

OPERATION

The self-calibration of the radar altimeter is a periodic, very short duration, interruptive test initiated preferably by a programmed microprocessor. For example, the test might be run every five seconds, but itself lasts only a few milliseconds. The present tracked altitude appearing at the output of the fixed altitude correction 46 and the AGC level appearing at the level control 42 is stored while the test is being run, and the altimeter is returned to this stored altitude and AGC level, following completion of the test phase. The test itself consists of generating a simulated or pseudo radar return at a known altitude at the altitude at which the aircraft is flying. As will be explained in considerably more detail below, the simulated or pseudo target is tracked by the tracker 32 and the resultant altitude developed by the tracker is compared to the known test altitude. The difference, i.e., the error, is then stored in the altitude calibration memory 52 where it is subsequently used to correct the output altitude during the ground tracking phase when the aircraft is flying in that particular altitude.

Figure 3:
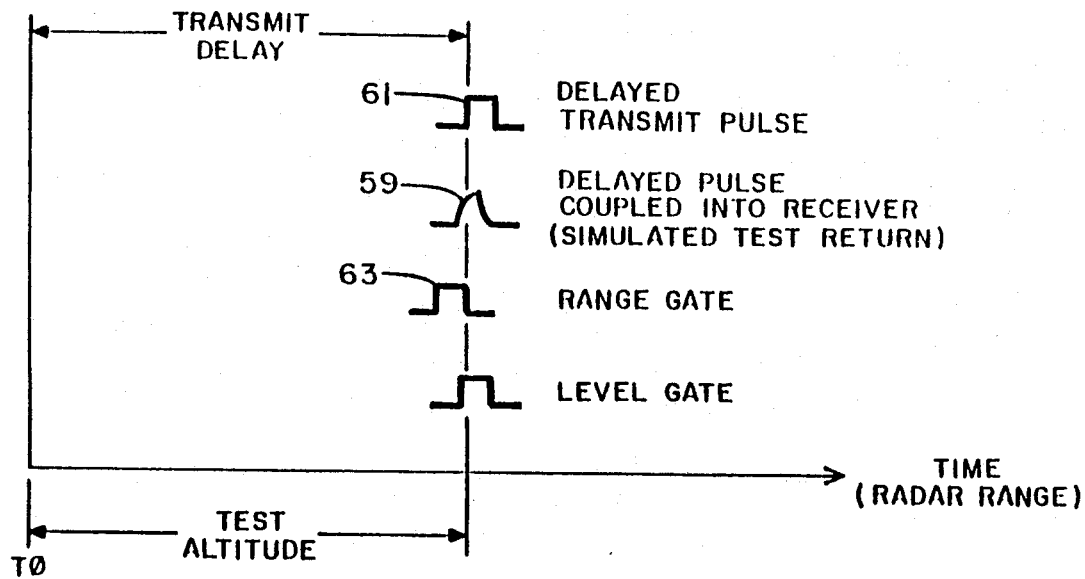
FIG. 3 is a signal waveform diagram helpful in explaining the operation of the system of FIG. 1 when in its self-calibration mode.

When the system is first powered up with the aircraft on the ground, the altitude correction memory 52 contains a correction of zero feet since no tests have yet been run. The altimeter, in its normal track mode, is tracking the ground return with the AGC level determined by the level control loop. At start of the test, the AGC voltage of the control loop is stored in the AGC memory, the AGC loop is opened, and the stored AGC voltage is applied to the receiver 28. The zero altitude value from the fixed altitude correction circuits 46 is used as an address for the test altitude memory which outputs a delay value on line 58 corresponding to zero feet to adjust the delay from the transmit delay generator 16 from the $T_0$ reference to correspond to that test altitude. Following the expiration of the delay interval in question, the transmitter 22 is triggered to emit a transmit pulse. Being in the test mode, the switch 103B will be in its low impedance condition allowing the transmitter output to be coupled to the input of the receiver 28. At the same time, the transmitter power level is reduced by the closed-loop level control block to a level resulting in the proper simulated signal level at the tracker, and RF switch 103A reduces the power applied to the transmit antenna 21 to a very low transmitted power level at the antenna and subsequent low ground return signal assuring no interference with the simulated signal. Thus, the simulated test return pulse 59 (FIG. 3) is effectively applied to the receiver simultaneously with the generation of the delayed transmit pulse 61. The receiver range gate 28 along with the altitude tracker 32 and the range gate delay generator 20 operates in its normal fashion to align the range gate 63 with the leading edge of the simulated test return. As is clearly evident, the simulated signal applied to the receiver is exactly the same amplitude as the ground return just prior to the test since the receiver gain is the same, and the closed loop controlling the transmit power sets the tracker signal level to its proper level.

Unless the system is in perfect calibration, the altitude derived by the tracker 32 will differ from the test altitude value for the altitude range involved and by subtracting the two in circuit 62, a correction factor results at the output of the subtract circuit 62 which is then stored in the automatic altitude correction memory 52. After each periodic short duration test, the radar altimeter system returns to the mode in which it is tracking the ground return with the correction produced and stored in the altitude correction memory 52 being used to adjust the indicated altitude.

Summarizing, then, when self-calibration is initiated, automatically and periodically, every five seconds, for example, the present position of the range gate 28 is monitored and used to address the test altitude memory 56 and the present AGC voltage value is monitored and stored in the AGC memory 101. A prestored test altitude corresponding to that address is read out from the test altitude memory 56 as a control value for the transmit signal delay generator 16. The transmit signal delay generator 16 then delays the transmit pulse from time $T_0$ by a time interval equal to the delay value read from the test altitude memory 56. At the same time, the prestored AGC level is read out from the AGC memory 101 and sets the gain of the receiver through switch 102. Also, at the same time, RF switch 103A is set to attenuate the signal applied to the transmitting antenna and switch 103B is set to a low impedance level, allowing the delayed transmit signal to be coupled directly, via calibration path 63, to the receiver 28. The tracker loop positions the range gate on the calibration signal while the level control loop 42 adjusts the transmit power to provide the appropriate signal level. The test altitude stored in test altitude memory 56 is then subtracted at 62 from the tracked altitude signal appearing at the output of the fixed altitude correction circuit 46, producing an altitude error signal which gets stored in the altitude correction memory 52 where it becomes available, via add circuit 50, to later modify the altitude indicated by tracking of the ground return to yield a corrected value.

It is to be especially noted that except for the short length calibration path 62, all signal paths and associated circuitry used during calibration are the same as those used during normal ground tracking operation, thus resulting in very accurate altitude calibration. Moreover, the crystal controlled reference clock (not shown) controlling the simulated target delay 16 is the same reference clock which is used in conjunction with the range gate delay generator 20 to position the range gate on the leading edge of the ground return. Because the calibration path consists of a line length and attenuator diodes whose equivalent radar delay variation with temperature is negligible, the self-calibration feature results in a highly accurate altimeter. By using the same format, i.e., the same transmitted pulse width and duty cycle during calibration as is used during ground tracking and by maintaining the same signal level ratio, the calibration factor established can be reliably used to adjust the altimeter readings as the altitude of the aircraft changes and as the temperature varies.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In an aircraft radar altimeter of the type including means for periodically transmitting a pulse of electromagnetic energy, means for receiving a return pulse from a target, said means for receiving including tracking means for continuously adjusting a range gate delay to orient a range gate in time coincidence with the leading edge of said return pulse, and interval measuring means for measuring a first interval between the transmitted pulse and said range gate, the improvement comprising:

(a) calibration circuit means coupled to receive a signal proportional to said measured first interval, said calibration circuit means including:
      (i) first memory means for periodically storing said first interval corresponding to a measured altitude for the duration of a calibration sequence;
      (ii) second memory means for storing correction factors for all altitudes at which the aircraft is expected to fly, wherein each said interval altitudes correspond to a unique said correction factor;

(iii) means for periodically applying a pseudo return pulse to said receiving means a predetermined delay time following a marker event, said delay time corresponding to the respective correction factor stored in said second memory means and proportional to the altitude at which said aircraft is then flying, said tracking means orienting said range gate in time coincidence with the leading edge of said pseudo return pulse, said interval measuring means measuring a second interval between said marker event and said range gate;

(iv) means for subtracting a signal proportional to said second interval from a signal proportional to said first interval to develop an error signal; and (v) means for adjusting said actual interval stored in said first memory means by said error signal following completion of said calibration phase.

2. A self-calibrating aircraft radar altimeter for compensating for changes in operation conditions of the aircraft, comprising:

(a) transmitting means responsive to a trigger event for delivering a transmit pulse to a transmitting antenna;

(b) receiver means normally coupled to a receiving antenna for receiving a ground return pulse delayed from said triggering event by a first time interval corresponding to the distance between said aircraft and the earth, and periodically coupled to receive a pseudo-ground return;

(c) a closed loop tracking means for alternatively aligning a range gate with said ground return and said pseudo-ground return and determining an altitude value;

(d) a calibration path operative to periodically directly couple said transmitting means to said receiving means;

(e) first memory means for storing actual tracked altitude values, said first memory means being addressed by an address value proportional to said first time interval;

(f) means for operatively coupling said first memory means to said transmitting means for generating said pseudo-ground return for said receiving means when said calibration path directly couples said transmitting means to said receiving means, said pseudo-ground return being delayed from said trigger event by an interval proportional to a discrete altitude read out from said first memory means, said tracking means operating to align said range gate with said pseudo-ground return;

(g) means for subtracting a value proportional to the interval between said trigger event and said range gate aligned with said pseudo-ground return from a value corresponding to said determined altitude to develop a precision correction factor;

(h) second memory means for storing said correction factor; and (i) means coupled to said second memory means for modifying said determined altitude first time interval by said correction factor.

3. The self-calibrating aircraft altimeter as in claim 2 wherein the time period that said tracking means is tracking said pseudo-ground return is substantially less than the time period that said tracking means is tracking said ground return pulse.

4. The self-calibrating aircraft altimeter as in claim 2 and further including level control means connectable between said receiving means and said transmitting means for adjusting the transmit power of said transmitting means to maintain a desired signal level at said closed loop tracking means, wherein said desired level corresponding to the amplitude of the signal measured during tracking of the pseudo-ground return is always generally equal to the signal level corresponding to an actual ground return pulse.

5. The self-calibrating aircraft altimeter as in claim 4 wherein said level control controls said pseudo-ground return level.

6. The self-calibrating altimeter as in claim 4 further comprising an automatic gain control circuit coupled to said receiver means and responsive to an AGC voltage, said altimeter further comprising third-memory means for storing said AGC voltage corresponding to the receiver gain sampled during the first interval measurement.

* * * * *

UNITED STATES PATENT AND TRADEMARK OFFICE
CERTIFICATE OF CORRECTION

PATENT NO. : 5,160,933
DATED : November 3, 1992
INVENTOR(S) : James R. Hager

It is certified that error appears in the above-indentified patent and that said Letters Patent is hereby corrected as shown below:

Column 6, line 66, cancel "interval" and substitute

--individual--.

Signed and Sealed this

Fifteenth Day of March, 1994

Attest:

BRUCE LEHMAN

*Attesting Officer*      *Commissioner of Patents and Trademarks*